(12) United States Patent
Tsuzuki et al.

(10) Patent No.: US 7,530,216 B2
(45) Date of Patent: May 12, 2009

(54) CONTROL SYSTEM FOR A GAS TURBINE ENGINE

(75) Inventors: Sadachika Tsuzuki, Wako (JP); Masaki Tanaka, Wako (JP)

(73) Assignee: Honda Motor Co., Ltd., Minato-ku, Tokyo (JP)

( * ) Notice: Subject to any disclaimer, the term of this patent is extended or adjusted under 35 U.S.C. 154(b) by 537 days.

(21) Appl. No.: 11/377,872

(22) Filed: Mar. 17, 2006

(65) Prior Publication Data

US 2006/0225403 A1   Oct. 12, 2006

(30) Foreign Application Priority Data

Apr. 7, 2005   (JP)   ............................. 2005-110545

(51) Int. Cl.
   *F02C 9/28*   (2006.01)
(52) U.S. Cl. .................. 60/39.281; 701/29; 701/100
(58) Field of Classification Search ............. 60/39.091, 60/39.281; 701/29, 31, 100; 702/182, 183, 702/184
   See application file for complete search history.

(56) References Cited

U.S. PATENT DOCUMENTS 6,438,484 B1 *   8/2002   Andrew et al. ............... 701/100
6,463,380 B1 *   10/2002   Ablett et al. ................. 701/100
6,625,987 B2 *   9/2003   Pisano et al. ................... 60/773

FOREIGN PATENT DOCUMENTS

JP   2002-4889   1/2002

\* cited by examiner

*Primary Examiner*—Louis J Casaregola
(74) *Attorney, Agent, or Firm*—Squire, Sanders & Dempsey, L.L.P.

(57) ABSTRACT

In a control system for a gas turbine engine, a degradation level of the gas turbine engine is estimated according to a deviation of an output of an internal temperature sensor when the engine is producing a target output at a target rotational speed from a prescribed reference temperature, and a correction value for correcting the engine operation map is computed according to the degradation level of the gas turbine engine. Thereby, even when the degradation of the engine has progressed to a certain extent typically owing to the aging of various component parts, the engine operation map can be corrected in such a manner that the level of fuel supply is optimally selected and the acceleration, efficiency and other items of performance of the engine can be improved.

4 Claims, 5 Drawing Sheets

CONTROL SYSTEM FOR A GAS TURBINE ENGINE

TECHNICAL FIELD

The present invention relates to a control system for a gas turbine engine, and in particular to a technology for controlling reductions in the capability to accelerate and the operating efficiency of a gas turbine engine owing to the deterioration of the engine owing to the aging of component parts or other reasons.

BACKGROUND OF THE INVENTION

In a gas turbine engine, various components thereof are subjected to high temperatures and high pressures so that they inevitably suffer degradation over time, and this may prevent the gas turbine engine from operating at an originally designed operating point. It means that the output of the engine drops over time. The engine may be able to produce a designed output at a certain rotational speed when it is new, but over time the engine will require an increased amount of fuel to produce the designed output at the same rotational speed. When a gas turbine engine operates at an operating point that provides a high efficiency and a low emission, the internal temperature of the engine is maintained at a level near a limit temperature. However, if an increased amount of fuel is supplied, the internal temperature may exceed the limit temperature, and it would adversely affect the various component parts. If such is a case, more frequent servicing would be required, and the maintenance cost of the engine would be increased.

Therefore, conventionally, during the operation of a gas turbine engine, a temperature sensor is used for detecting the internal temperature (either turbine inlet pressure TIT or turbine outlet pressure TET), and conduct a feedback control by using this temperature data and shifting the rotational speed to a higher range so as to achieve the rated output without increasing the detected internal temperature beyond the limit temperature. However, because the internal temperature may also be affected by the inlet state (such as the atmospheric temperature and atmospheric pressure), it is not possible to distinguish if a drop in the engine output is owing to the degradation of the engine or the change in the inlet state. Therefore, the engine may continue to be operated at a low efficiency although it is due to the degradation of the engine until it is determined by the next inspection of the engine.

Also, in a transient state of the engine such as when accelerating, because a feedback control may not be able provide a required quick response owing to the lack of responsiveness in the temperature sensor, it was proposed to use a schedule control (which determines the amount of fuel supply from a predetermined fuel map). However, as the degradation of the gas turbine engine progresses, the fuel map used for the schedule control becomes far from optimum so that it becomes necessary to set up the schedule with a sufficient margin and this prevents the engine to be operated in an optimum fashion.

To produce a designed output even after the degradation of the engine has progressed to a certain extent, it was proposed to compute the amount of fuel supply by multiplying a proportional gain to a difference between the target rotational speed and the actual rotational speed and adding to this value the amount of fuel supply for a zero-load condition as disclosed in Japanese patent laid open publication No. 2002-4889.

This enables the engine to produce a designed output even when the degradation of the engine has progressed to a certain extent, but it is inevitable that the gas turbine engine to be operated at a relatively low efficiency because the internal temperature of the engine is not taken into account.

BRIEF SUMMARY OF THE INVENTION

In view of such problems of the prior art, a primary object of the present invention is to provide a control system for a gas turbine engine which can maintain the acceleration and other items of performance at acceptable levels even after the degradation of the engine has progressed to a certain extent owing to aging or the like.

A second object of the present invention is to provide a control system for a gas turbine engine which can accurately evaluate the extent of the degradation of the engine and provide a maintenance warning when the degradation of the engine has reached a certain level that would require a maintenance work.

According to the present invention, these and other objects of the present invention can be accomplished by providing a control system for a gas turbine engine, comprising: an inlet state sensor for detecting at least one physical value of intake air of the gas turbine engine; an internal temperature sensor for detecting at least one of a turbine inlet temperature and a turbine outlet temperature; a fuel supply valve for supplying fuel to the gas turbine engine at a prescribed flow rate; an engine operation map that gives a target rotational speed in relation to an output from the inlet state sensor and a target output of the gas turbine engine; an engine control unit for controlling the fuel supply valve such that the gas turbine engine produces the target output at the target rotational speed given by the engine operation map; a degradation level estimating unit for estimating a degradation level of the gas turbine engine according to a deviation of an output of the internal temperature sensor when the engine is producing the target output at the target rotational speed from a prescribed reference temperature; and a correction valve computing unit for computing a correction value for correcting the engine operation map according to the degradation level of the gas turbine engine estimated by the degradation level estimating unit.

Thus, even when the degradation of the engine has progressed to a certain extent typically owing to the aging of various component parts, the engine operation map can be corrected in such a manner that the level of fuel supply is optimally selected and the acceleration, efficiency and other items of performance of the engine can be improved. In particular, if the system further comprises a degradation warning unit for producing a warning when the correction value has reached a prescribed threshold value, it becomes possible to know when a maintenance work would be necessary and to avoid a continued operation of the engine at a low efficiency over a prolonged period of time.

One of the turbine inlet temperature and turbine outlet temperature serves as a limiting factor in determining the engine output at a given rotational speed under a certain condition, but the other of the turbine inlet temperature and turbine outlet temperature serves as a limiting factor in determining the engine output at a given rotational speed under a different condition. It is therefore preferable to monitor and take into consideration both the turbine inlet temperature and turbine outlet temperature in determining the operation curve of the gas turbine engine so that the optimum operation condition may be selected at all times.

Because the transient state of the engine would not allow the gradation level of the gas turbine engine to be estimated with a desired accuracy, the degradation level estimating unit may be configured so as to estimate a degradation level of the gas turbine engine only when a steady state operation of the gas turbine engine is detected.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
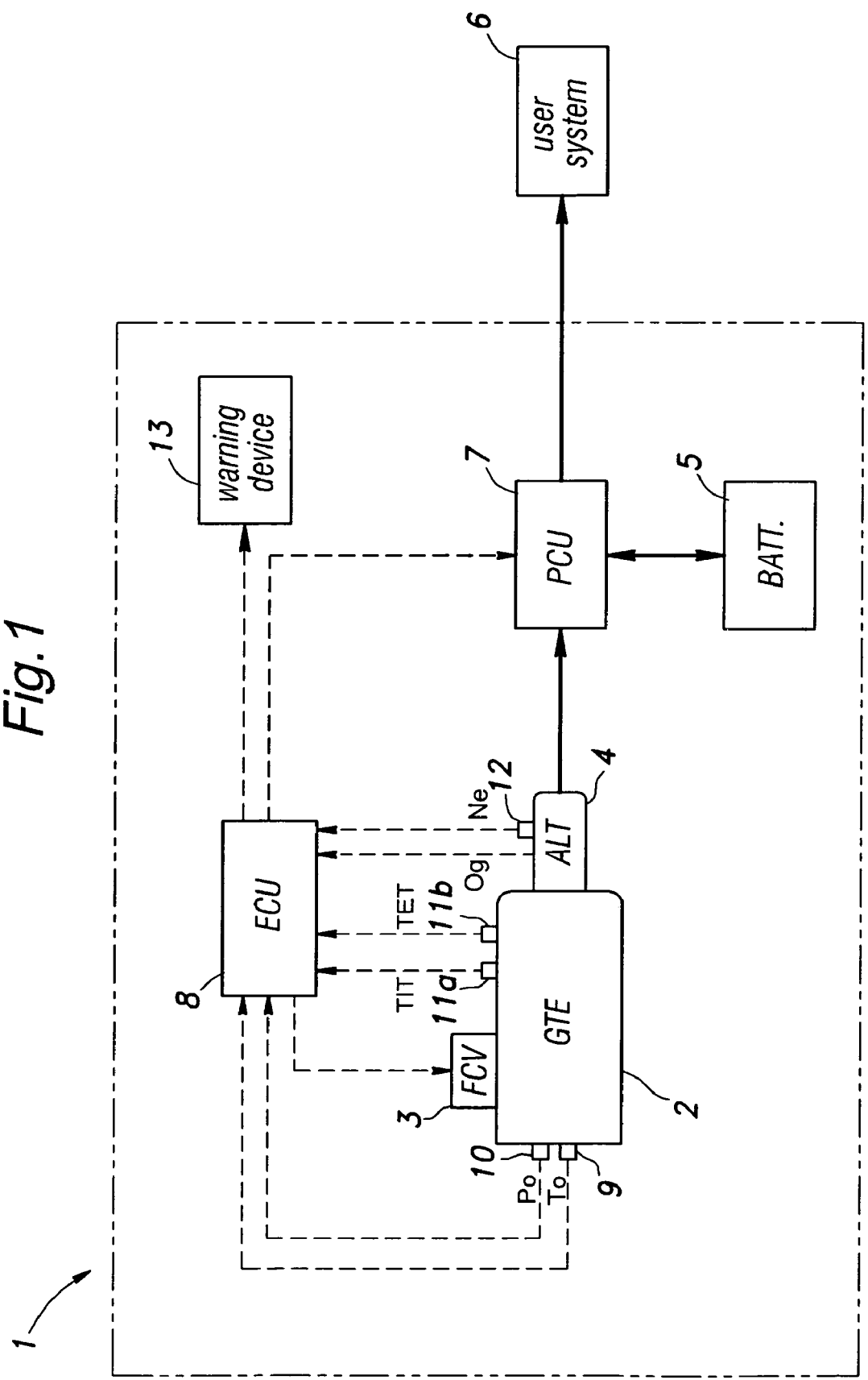
FIG. 1 is a block diagram of a gas turbine engine generator system incorporated with an engine control system embodying the present invention.
Figure 2:
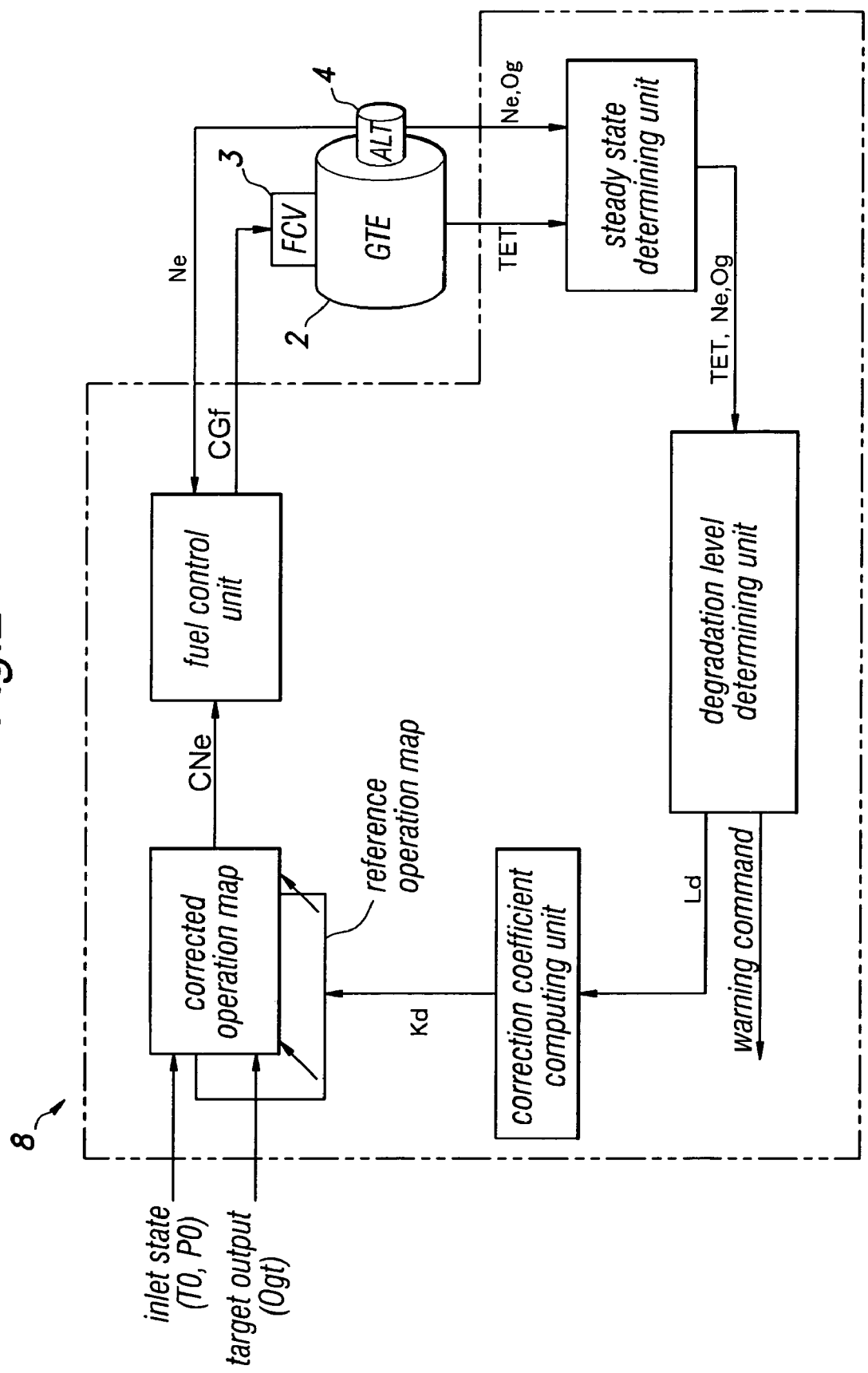
FIG. 2 is a block diagram showing the logic in correcting the operation map of the engine control system according to the present invention.
Figure 3:
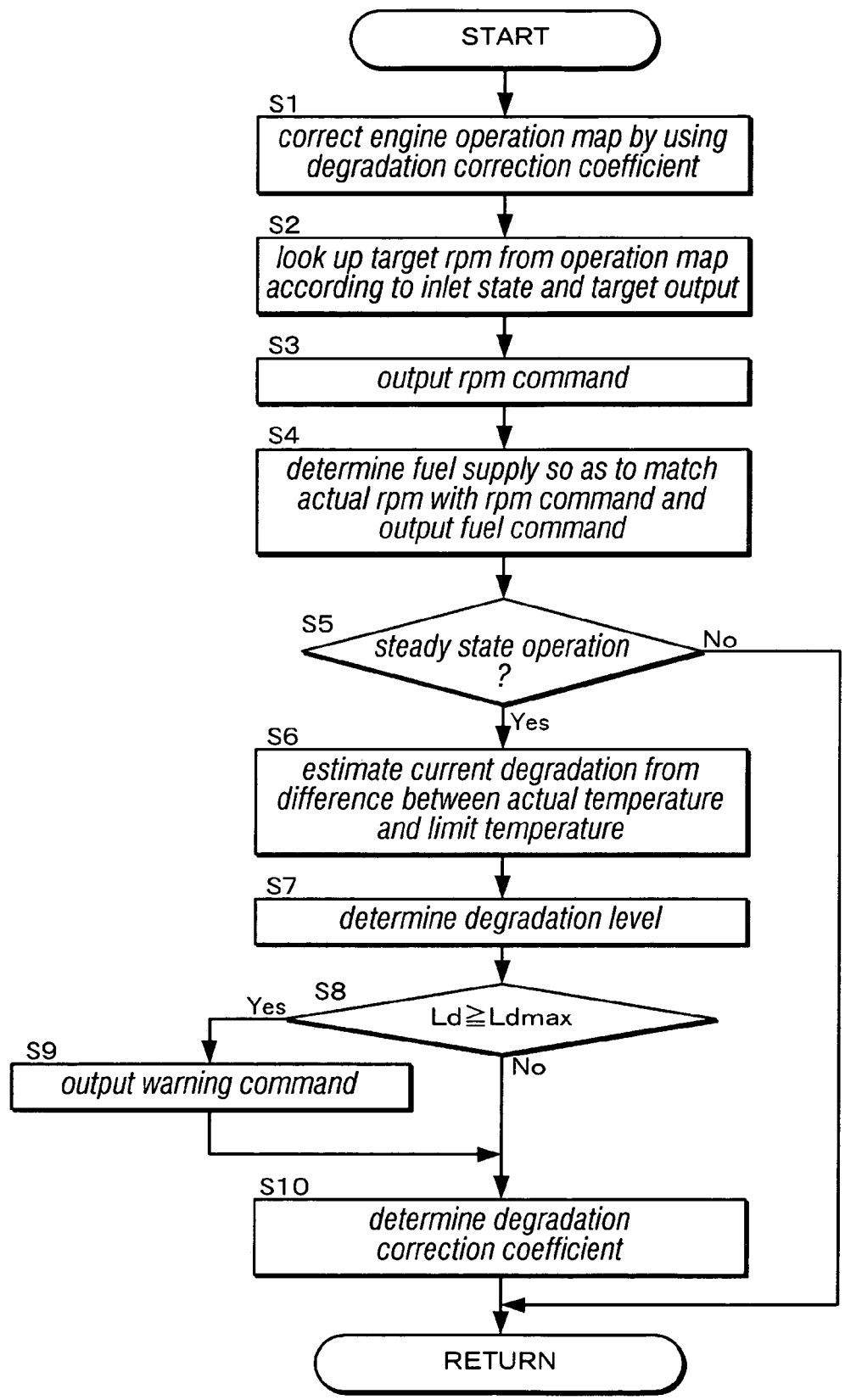
FIG. 3 is a flowchart showing the process of controlling the operation of the engine according to the present invention.

FIG. 1 shows a gas turbine power generator system 1 embodying the present invention, and this power generator system 1 comprises a gas turbine engine 2, a fuel supply valve 3 for supplying fuel to the gas turbine engine 2, an alternator 4 (power generator) driven by the gas turbine engine 2, a battery system 5 for storing the electric power generated by the alternator 4, a power control unit 7 for controlling the alternator 4 and battery system 5 according to the state of a user system 6 and an engine control unit 8 for controlling the mode of operation of the gas turbine engine 2.

The gas turbine engine 2 is provided with an air temperature sensor 9 for detecting the air temperature T0 at the inlet end of the combustion chamber, an atmospheric pressure sensor 10 for detecting the atmospheric pressure P0, an inlet temperature sensor 11a for detecting an inlet temperature TIT of the turbine of the engine and an outlet temperature sensor 11b for detecting the outlet temperature TET of the turbine, and the outputs of these sensors 9 to 11 are forwarded to the engine control unit 8. The alternator 4 is provided with a rotational speed sensor 12 for detecting the rotational speed of the alternator 4 and hence the rotational speed of the gas turbine engine 2, and the output of this rotational speed sensor 14 is also forwarded to the engine control unit 8 along with the output Og of the alternator 4. The illustrated gas turbine engine generator system 1 is also provided with a warning device 13 for providing an audible and/or visible alarm to an operator according to a command from the engine control unit 8.

The power control unit 7 is designed to control the output of the alternator 4, and comprises a converter unit for converting the AC output of the alternator 4 into DC power and an inverter unit for converting this DC power and/or the DC power stored in the battery system 5 into commercial AC power. The engine control unit 8 comprises a microcomputer, ROM, RAM, peripheral circuits, input/output interfaces and various driver circuits, and is configured to control the fuel supply valve 3 and the power control unit 7 according to various control programs stored in the ROM.

During the operation of the gas turbine power generator system 1, the power control unit 7 and the engine control unit 8 carry out the following control process.

Figure 4:
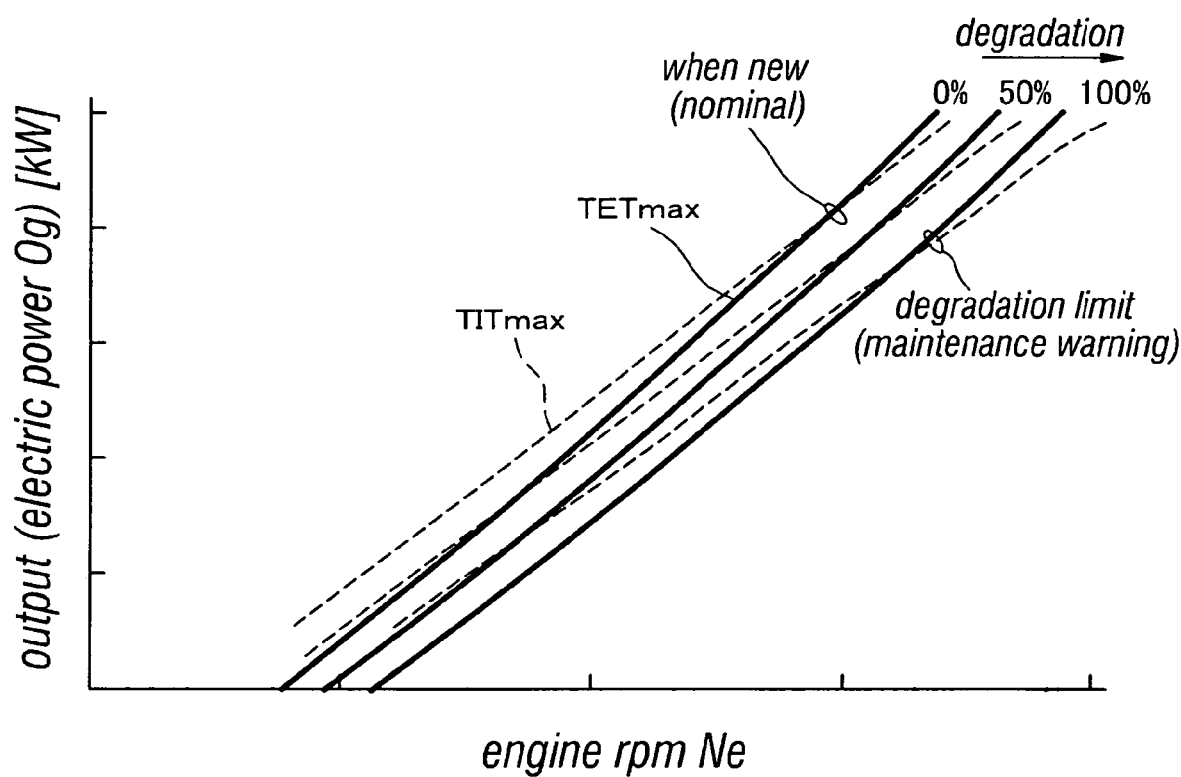
FIG. 4 is a graph showing the engine operation map according to the present invention.

First of all, in step S1, the engine control unit 8 corrects an engine operation map by using a degradation correction coefficient which is described hereinafter. The engine operation map shown in FIG. 4 gives an engine operation curve (or a relationship between the rotational speed Ne and the output of the engine or the output Og of the alternator 4) which enables the engine to operate in such a manner that at least one of the internal temperatures (turbine inlet temperature TIT and turbine outlet temperature TET) is equal to the corresponding limit temperature. As the degradation of the engine 2 progresses in time, the rotational speed Ne for producing a given output rises, and the engine operation curve shifts rightward in FIG. 4. As shown in FIG. 4, the engine operation curve is determined by the turbine outlet temperature TET in a low to intermediate output region, and by the turbine inlet temperature TIT in a high output region. In FIG. 4, the engine operation curve when the engine is new (nominal engine operation curve) is indicated by 0% and that when the degradation has reached a limit (maintenance warning) is indicated by 100%.

The engine control unit 8 then determines, in step S2, a target rotational speed Net of the gas turbine engine 2 according to the inlet state of the gas turbine engine 2 (atmospheric temperature and atmospheric pressure detected by the atmospheric temperature sensor 9 and atmospheric pressure sensor 10) and the target output Ogt by using the engine operation map which was corrected in step S1. The engine control unit 8 generates a rotational speed command CNe which corresponds to the target rotational speed Net, and forwards it to the fuel control unit in step S3. The engine control unit 8 further controls the supply of fuel via the fuel control valve 3 such that the rotational speed Ne comes to match the rotational speed command CNe, and forwards a corresponding fuel command CGf to the fuel supply valve 3 in step S4. Thereby, the gas turbine engine 2 operates at a prescribed rotational speed Net, and the alternator 4 generates electric power by an amount corresponding to the alternator target output Ogt.

The engine control unit 8 determines if the gas turbine engine 2 is operating under a steady state condition or not according to the changes in the turbine inlet temperature TIT, turbine outlet temperature TET, rotational speed Ne and alternator output Ogt in step S5. If not, the engine control unit 8 returns to the starting point of the control process, and repeats the above described control process because the engine is in a transient state which is not suitable for estimating the degradation level of the gas turbine engine 2.

When the gas turbine engine has continued to be in a steady state operation for more than a prescribed period of time (a few minutes, for instance) or the determination result of step S5 is yes, the engine control unit 8 determines a degradation level by using a degradation level determining unit in steps S6 and S7. In other words, the engine control unit 8 conducts a feedback control in step S6 so that the turbine outlet temperature TET detected by the outlet temperature sensor 11b may be kept constant, and estimates the current advance in the degradation level $\Delta Ld$ of the gas turbine engine 2 according to a deviation of the target temperature obtained from the current rotational speed Ne and alternator output Og from the actual turbine outlet temperature TET. The engine control unit 8 determines the current degradation level by adding the current advance in the degradation level $\Delta Ld$ to the previous degradation level Ld. The engine control unit stores the current degradation level Ld in non-volatile memory such as EEPROM so that the determination of the degradation level can be continued even when the gas turbine engine generator system 1 is shut down and restarted from time to time.

The engine control unit 8 then determines if the current degradation level Ld has reached a prescribed maintenance warning level Ldmax in step S8, and if this determination result is yes, forwards a warning command to the warning device 13 in step S9.

Irrespective of issuing a warning or not, when the degradation level is determined, the engine control unit 8 updates the degradation correction coefficient Kd corresponding to the current degradation level Ld by using the correction coefficient determining unit in step S110. Thereby, the correction of the engine operation map can be conducted at a high precision, and the efficiency of the gas turbine engine 2 can be improved. The engine control unit 8 stores the current degradation correction coefficient Cd in non-volatile memory such as EEPROM so that the engine operation map may be properly corrected even when the gas turbine engine generator system 1 is shut down and restarted from time to time.

Figure 5:
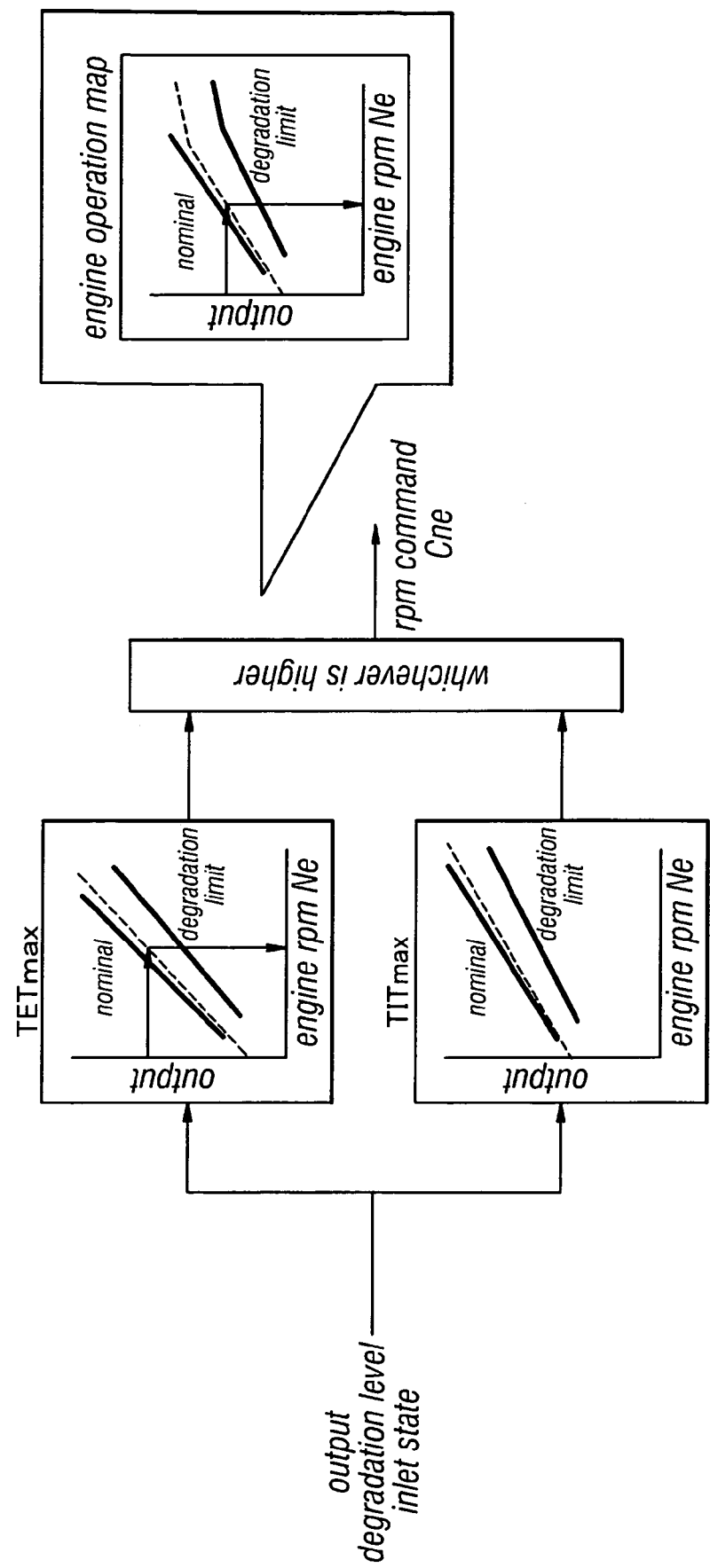
FIG. 5 is a diagram showing the process of determining the target rotational speed according to the present invention.

In the foregoing embodiment, only the turbine outlet temperature TET was monitored if it has reached a limit temperature or not because the engine operation map is substantially dictated by the turbine outlet temperature TET. However, it is also possible and more preferable to monitor the turbine inlet temperature TIT as well, and define the engine operation map such that both the turbine outlet temperature TET and the turbine inlet temperature TIT remain below the corresponding limit values. FIG. 5 is a diagram showing how one of the turbine inlet temperature TIT and turbine outlet temperature TET may be selected over the other when determining the engine operation map. A first target rotational speed is looked up from the engine operation map based on the limit temperature of the turbine outlet temperature TET, and a second first target rotational speed is looked up from the engine operation map based on the limit temperature of the turbine inlet temperature TIT. Of the first and second target rotational speeds, the higher one is selected and incorporated into the rotational speed command Cne. Thereby, both the turbine inlet temperature TIT and turbine outlet temperature TET are kept within the limit temperatures, and the engine operation curve can be selected in an optimum fashion at all times.

Although the present invention has been described in terms of preferred embodiments thereof, it is obvious to a person skilled in the art that various alterations and modifications are possible without departing from the scope of the present invention which is set forth in the appended claims. For instance, although the gas turbine engine was used to power an electric generator in the foregoing embodiment, the present invention can also be applied to gas turbine engines for other purposes as well.

The contents of the original Japanese patent application on which the Paris Convention priority claim is made for the present application are incorporated in this application by reference.

The invention claimed is:

1. A control system for a gas turbine engine, comprising:
an inlet state sensor for detecting at least one physical value of intake air of the gas turbine engine;
an internal temperature sensor for detecting at least one of a turbine inlet temperature and a turbine outlet temperature;
a fuel supply valve for supplying fuel to the gas turbine engine at a prescribed flow rate;
an engine operation map that gives a target rotational speed in relation to an output from the inlet state sensor and a target output of the gas turbine engine;
an engine control unit for controlling the fuel supply valve such that the gas turbine engine produces the target output at the target rotational speed given by the engine operation map;
a degradation level estimating unit for estimating a degradation level of the gas turbine engine according to a deviation of an output of the internal temperature sensor when the engine is producing the target output at the target rotational speed from a prescribed reference temperature; and
a correction value computing unit for computing a correction value for correcting the engine operation map according to the degradation level of the gas turbine engine estimated by the degradation level estimating unit.

2. The control system for a gas turbine engine according to claim 1, further comprising a degradation warning unit for producing a warning when the correction value has reached a prescribed threshold value.

3. The control system for a gas turbine engine according to claim 1, wherein the output of the internal temperature sensor indicates the turbine inlet temperature when the engine operates under a first condition and the turbine outlet temperature when the engine operates under a second condition.

4. The control system for a gas turbine engine according to claim 1, wherein the degradation level estimating unit is configured so as to estimate a degradation level of the gas turbine engine only when a steady state operation of the gas turbine engine is detected.

\* \* \* \* \*